Figure 1:
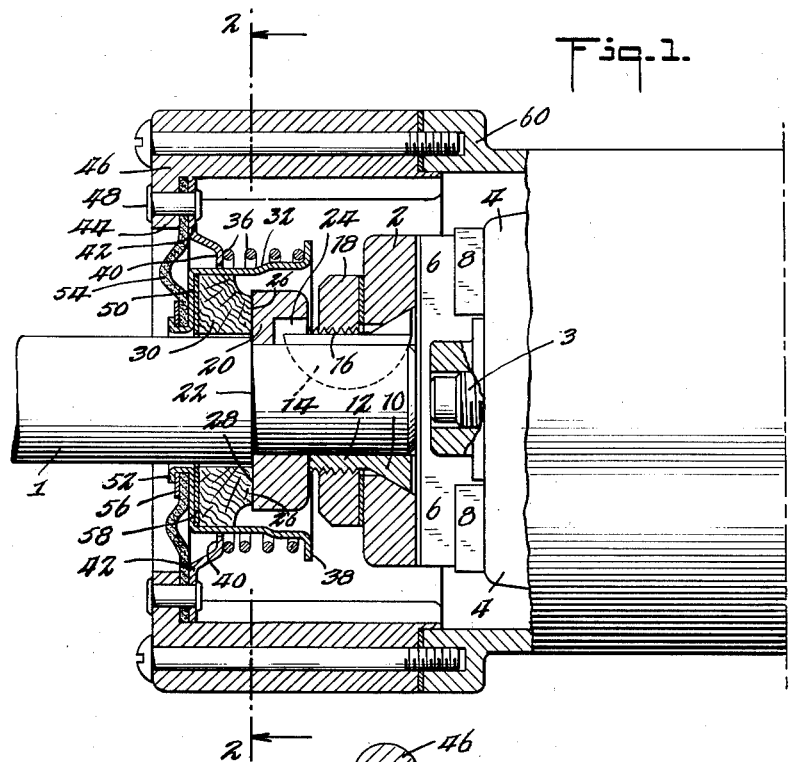

March 13, 1934.  G. F. KUEHN ET AL  1,950,852

DUST SEAL

Filed March 21, 1932

INVENTORS
GEORGE F. KUEHN
GEORGE A. RICHROATH
BY THEIR ATTORNEYS

Howson and Howson

Patented Mar. 13, 1934

1,950,852

UNITED STATES PATENT OFFICE 1,950,852

DUST SEAL

George F. Kuehn, Jackson Heights, and George A. Richroath, Brooklyn, N. Y., assignors to Eisemann Magneto Corporation, New York, N. Y., a corporation of New York Application March 21, 1932, Serial No. 600,312

2 Claims. (Cl. 286—11)

This invention relates to dust seals or guards and more particularly to means for preventing dirt or other foreign substances from passing along a rotating shaft to bearings or other parts it is desired to maintain free therefrom and it is an object of this invention to provide a means of the type described which will be efficient and reliable in operation, comprise but few simple parts and which may be economically manufactured.

Figure 2:
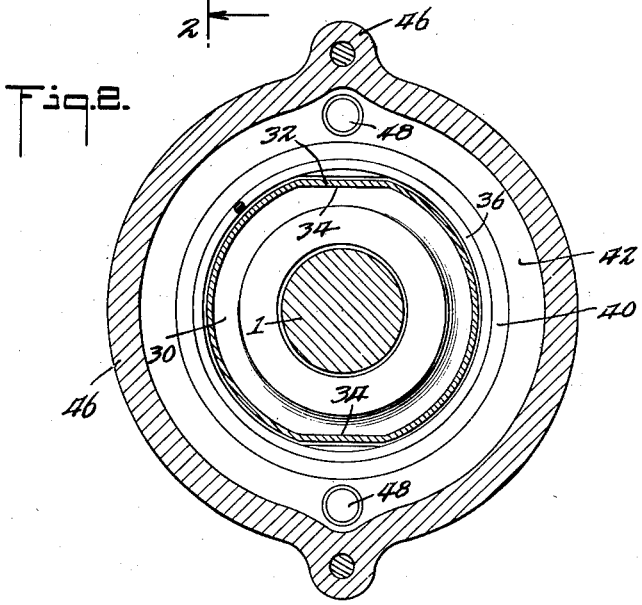

In the drawing:

Fig. 1 is a section of a dust seal constructed in accordance with this invention, only sufficient of the parts with which it is associated being shown in order to show the relation of the dust seal thereto; and Fig. 2 is a vertical section taken on the line 2—2 of Fig. 1.

In the drawing the invention is shown applied to a shaft 1 which is driven by a suitable means (not shown) and serves to drive a magneto by means of a clutch comprising plates 2 and 4 secured to the shaft 1 and the magneto shaft or extension 3 and having engaging projecting lugs 6 and 8 respectively. The plate 2 is provided with a tapered opening which fits a correspondingly tapered shoulder 10 on a collar 12 secured to the shaft 1 by a key 14. The collar 12 is threaded, as at 16, to receive a lock nut 18 which secures the plate 2 in position on the shoulder 10 of the collar 12.

The dust seal comprises a hardened steel collar 20 which is mounted on the shaft 1 between the collar 12 and a shoulder 22 formed on the shaft 1. The collar 20 is formed with a recess 24 to receive an end of the key 14 and is driven with the shaft 1. The collar 20 has a finished surface at 26 which engages with a correspondingly finished surface 28 of a treated annular wood block or collar 30 which has an opening therein of such diameter as to permit free rotation of the shaft 1. The block 30 is fitted in the pan or shell 32 and is flattened at diametrically opposite points as at 34 to fit correspondingly flattened portions of the shell 32 and prevent rotation of the block 30 relatively to the shell 32. The shell 32 is surrounded by a coil spring 36 which is confined between a laterally projecting flange 38 and an offset flange 40 on a ring 42. The ring 42 is attached to the flange 44 of the housing or casing 46 by fastening means 48. The flange 40 is shaped to fit the flattened portions of the shell 32 and prevents rotation of the shell while permitting movement of the shell axially of the shaft 1. The base or bottom 50 of the shell 32 against which the wood block 30 bears is formed with an opening to receive the shaft 1. Surrounding the opening in the base 50 of the shell 32 is a flange 52 comprising outwardly and laterally projecting portions which serve as a fastening means for securing the inner edge of an annular washer 54 of leather or other suitable flexible material, the outer portion of which is secured to the housing 46 by the fastening means 48. If desired, a metallic retaining ring 56 may be used to aid in securing the leather washer in position and a resilient packing or filler 58 may be inserted between the wood block 30 and the bottom 50 of the shell 32 in order to overcome any uneven surface and assure positive seal at this point. The housing 46 is fastened to the annular flange 60 by suitable securing means. The flange 60 is, in practice, formed as an outwardly projecting flange on a magneto end plate (not shown) but it may be any suitably formed portion of the casing or housing of the device to which the dust seal is to be applied.

With the parts arranged and connected as shown in the drawing, the shell 32 is held against rotation by the flattened portions of flange 40, which hold cup 32 and wood block 30 against rotation but axial movement of the shell 32 and wood block 30 with respect to the casing 46 is permitted by the leather washer 54. The hardened steel collar 20, being keyed to the shaft 1, rotates therewith and the engaging surfaces 26 and 28 of the collar 20 and block 30 are held in engagement by the spring 36 which acts through the shell 32 to force the block 30 against the collar 20. This arrangement provides a yielding contact between the block 30 and collar 20 which closes the only passage for dirt or other foreign substances from the outside to the interior of the casing 46 and circular flange 60 and effectively prevents the entry of dirt or other foreign substances therein while it permits sufficient movement of the shaft 1 to compensate for slight misalignments of the shaft 1 and the magneto shaft and it also permits of the end play of the shafts usual in such constructions without causing the breaking of the dust seal.

We claim—

1. In a dust seal for shafts, a member rotating with the shaft, a fixed housing, a pan-shaped shell having its bottom perforated and receiving the shaft, flexible means secured to said housing and said shell bottom, said means flexing with movement of said shell axially of said housing, a ring member fitting said shell and held against rotation thereby, engaging faces on said members, an abutment secured to said housing and surrounding said shell and a spring engaging said abutment and shell and operating said shell to hold the engaging faces of said members in contact.

2. In a dust seal for shafts, a member fixed on said shaft, supporting means for said shaft, a housing, means securing said housing to said supporting means, a pan-shaped shell having an opening in its bottom to receive said shaft, flexible means secured to said housing and shell bottom, said means flexing with movement of said shell axially of said housing, a ring member fitting said shell and held against rotation thereby, engaging faces on said members, an annular abutment secured to said housing and surrounding said shell and a spring surrounding said shell and engaging said abutment and said shell and operating said shell to hold the engaging faces of said members in contact, said shell, spring, abutment and flexible member being removable with said housing as a unit.

GEORGE F. KUEHN.
GEORGE A. RICHROATH.